United States Patent [19]

Davis

[11] Patent Number: 6,151,678

[45] Date of Patent: *Nov. 21, 2000

[54] ANTI-THEFT MECHANISM FOR MOBILE COMPUTERS

[75] Inventor: Derek L. Davis, Phoenix, Ariz.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/927,370

[22] Filed: Sep. 9, 1997

[51] Int. Cl.[7] .............................. G06F 11/00; H02H 3/05
[52] U.S. Cl. ............................... 713/200; 714/36; 714/47
[58] Field of Search ............................. 395/186, 188.01, 395/187.01; 713/200, 201; 714/47, 36, 48

[56] References Cited

U.S. PATENT DOCUMENTS

| | | | |
|---|---|---|---|
| 4,578,531 | 3/1986 | Everhart et al. ..................... | 178/22.08 |
| 4,694,492 | 9/1987 | Wirstrom et al. .......................... | 380/23 |
| 4,771,461 | 9/1988 | Matyas ...................................... | 380/24 |
| 4,962,532 | 10/1990 | Kasiraj et al. ............................ | 380/25 |
| 5,020,105 | 5/1991 | Rosen et al. .............................. | 380/23 |
| 5,142,579 | 8/1992 | Anderson .................................. | 380/30 |
| 5,214,702 | 5/1993 | Fischer ...................................... | 380/30 |
| 5,231,666 | 7/1993 | Matyas ...................................... | 380/25 |
| 5,323,464 | 6/1994 | Elander et al. ............................ | 380/24 |
| 5,371,794 | 12/1994 | Diffie et al. ................................ | 380/21 |
| 5,396,558 | 3/1995 | Ishiguro et al. .......................... | 380/25 |
| 5,422,953 | 6/1995 | Fischer ...................................... | 380/23 |
| 5,442,706 | 8/1995 | Kung ........................................ | 380/30 |
| 5,448,045 | 9/1995 | Clark ...................................... | 235/382 |
| 5,473,692 | 12/1995 | Davis ........................................ | 380/25 |
| 5,499,295 | 3/1996 | Cooper ...................................... | 380/23 |
| 5,539,828 | 7/1996 | Davis ........................................ | 380/50 |
| 5,568,552 | 10/1996 | Davis .......................................... | 380/4 |
| 5,796,840 | 8/1998 | Davis ........................................ | 380/50 |
| 5,805,706 | 9/1998 | Davis ........................................ | 380/49 |
| 5,805,712 | 9/1998 | Davis ........................................ | 380/50 |
| 5,818,939 | 10/1998 | Davis ........................................ | 380/49 |
| 5,828,753 | 10/1998 | Davis ........................................ | 380/49 |
| 5,844,986 | 12/1998 | Davis .......................................... | 380/4 |

*Primary Examiner*—Norman M. Wright
*Attorney, Agent, or Firm*—Blakely, Sokoloff, Taylor & Zafman LLP

[57] ABSTRACT

An electronic system that remains disabled after power-on until its user is recognized. The electronic system includes a host processor and a deactivation circuit coupled to the host processor. The deactivation circuit places the host processor into an inoperative state until the user is recognized. In one embodiment, the deactivation circuit is a security processor coupled to a reset input of the host processor. The security processor includes a processing unit and an internal memory unit to contain software required by the host processor to complete a booting procedure.

17 Claims, 5 Drawing Sheets

ANTI-THEFT MECHANISM FOR MOBILE COMPUTERS

BACKGROUND OF THE INVENTION

1. Field of the Invention

The present invention relates to the field of data security. More particularly, this invention relates to a mechanism that disables the operation of an electronic system until its user is recognized.

2. Description of Related Art

Over the last few years, mobile computers (e.g., laptop, hand-held, etc.) have become one of the fastest growing computer-related products. One reason is that mobile computers are highly versatile because they are implemented with one or more battery packs. As a result, mobile computers do not require an external power source for a prolonged period of time. This allows business persons to increase their productivity when traveling, visiting customers, attending off-site meetings, reviewing and drafting patent applications, and the like.

Of major concern, however, is that mobile computers are vulnerable to theft due to their commercial value and their exposure to insecure environments such as cars, hotel rooms and airport lobbies. Although stored content may have value to a business competitor, mobile computers usually are stolen for their commercial value as a computer.

Currently, there exist a number of security mechanisms that are marginally effective. However, these mechanisms are still vulnerable to component or device replacement. For example, one type of conventional security mechanism involves the use of password software, which is normally executed after a central processing unit (CPU) of the mobile computer has been powered-up and has fetched macro-instructions from Basic Input/Output System (BIOS). Normally, BIOS resides in a Read Only Memory (ROM) component in close proximity to the CPU. These BIOS instructions enable the CPU to properly execute password software. After correctly inputting a previously chosen password, a user is allowed access to stored contents of the mobile computer. Unfortunately, this security mechanism can be easily circumvented by replacing the ROM component containing BIOS or perhaps the hard drive containing the password software.

Hence, it is contemplated that the integration of a security mechanism, implemented within each mobile computer to halt its computer functionality until an authorized user is recognized, would discourage mobile computer theft.

SUMMARY OF THE INVENTION

The present invention relates to an electronic system that remains disabled after power-on until its user is recognized. The electronic system includes a host processor and a deactivation circuit coupled to the host processor. The deactivation circuit places the host processor into an inoperative state until the user is recognized. In one embodiment, this inoperative state is achieved by preventing the host processor from receiving instructions.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention relates to circuitry and its corresponding method of placing an electronic system into an inoperative state until its user is recognized. In an inoperative state, the electronic system is incapable of functioning as intended. A deactivation circuit is used to prevent the release of any BIOS instructions to a host processor of the electronic system until the user of the electronic system has been recognized. In one embodiment, the deactivation circuit includes a processor implemented with boot software including Basic Input/Output System (BIOS) instructions. This processor is referred to herein as a "security processor".

Herein, while certain details are set forth in order to provide a thorough understanding of the present invention, it is apparent to a person of ordinary skill in the art that the present invention may be practiced through many embodiments other that those illustrated. In other instances, well-known circuits are not set forth in detail in order to avoid unnecessarily obscuring the present invention.

In the following description, terminology is used to discuss certain features of the present invention. For example, an "electronic system" includes any type of computer, especially a mobile computer such as a laptop or hand-held computer, as well as any device possessing data processing functionality. A "signal line" is broadly defined as one or more information-carrying mediums (electrical wires, fiber optics, cables, etc.) or wireless communications through established techniques such as infrared (IR) and radio frequency (RF) signaling.

In addition, the term "recognize" (as well as other tenses) is defined as a condition in which certain characteristics of an intended user have been authenticated or identified. Under an authentication scheme, the identity of the intended user is known. Thus, data pertaining to at least one characteristic of the user (referred to as "character data") is retrieved and directly compared with incoming data. This character data may be any data type, including biometric or alphanumeric, pre-stored within the electronic system or within another device in communication with the electronic system. In contrast, under an identification scheme, the identity of the user is unknown. Thus, if multiple users are authorized to use the electronic system, the incoming data is compared in a successive manner with character data of all authorized users until (i) a successful comparison is detected, or (ii) all comparisons with access data has been completed. If the later condition occurs, the electronic system continues to remain in its inoperative state.

Figure 1:
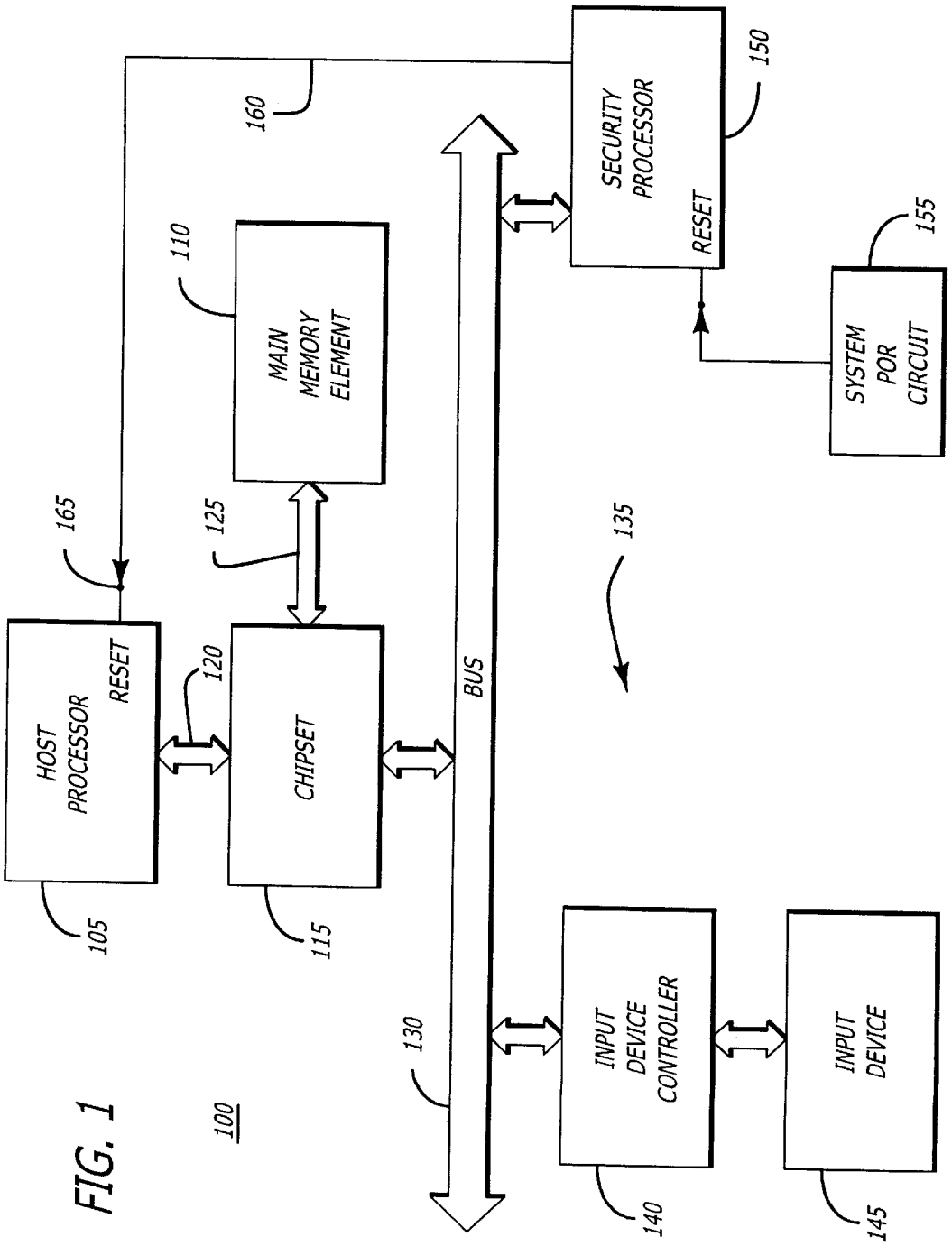
FIG. 1 is a first embodiment of the present invention where the BIOS flash memory resides inside a security processor implemented as a coprocessor interfaced to the PCI bus.

Referring to FIG. 1, a first illustrative embodiment of an electronic system 100 is shown in which electronic system 100 is placed into an inoperative state until its user is recognized. As shown, electronic system 100 (e.g., a mobile computer) includes at least one host processor 105 and a main memory element 110 (e.g., non-volatile or volatile memory such as dynamic random access memory "DRAM" or static random access memory "SRAM") coupled together by a chipset 115. The chipset 115 operates as an interface for a host bus 120, a memory bus 125 and a bus 130 in order to support communications between devices coupled to these buses 120, 125 and 130. The bus 130 may be implemented as a single bus or as multiple buses interconnected through bridge circuitry. Bus 130 may be constructed in accordance with a number of well-known bus architectures, including but not limited or restricted to a Peripheral Component Interconnect (PCI) bus, an Accelerated Graphics Port (AGP) bus, an Industry Standard Architecture (ISA) bus, an Extended ISA (EISA) bus, or an any another type of bus architecture.

In this embodiment, at least one peripheral device 135 is coupled to bus 130. The peripheral device 135 may include an input device controller 140. The input device controller 140 is coupled to an input device 145. The input device 145 may include an alphanumeric keyboard or keypad, a cursor control device (e.g., a mouse, trackball, Touchpad™, joy stick, electronic pen, etc.) or even a biometric input device for capturing digital images of a fingerprint, palm print, retinal scan, or other characteristic of an intended user.

As further shown in the illustrative embodiment of FIG. 1, a deactivation circuit 150 (e.g., security processor) is coupled to bus 130 of electronic system 100. In general, security processor 150 is an electronic device that is capable of preventing host processor 105 from receiving instructions normally executed during a boot procedure (referred to as "boot instructions) until the user of the electronic system 100 is recognized (authenticated or identified). These boot instructions may include BIOS instructions which is usually part of the Operating System (OS) of electronic system 100. The BIOS instructions enable host processor 105 to perform of a variety of tasks such as initialization of hardware, diagnostics, loading the operating system kernel from mass storage, and routine I/O functions.

Referring still to FIG. 1, in contrast with normal mobile computer platforms in which the host processor 105 was reset by system power-on reset (POR) circuit 155 coupled to a Reset lead 165 of host processor 105, host processor 105 is reset by security processor 150 transmitting a HOST RESET signal to Reset lead 165. More specifically, the present invention may be configured by disconnecting standard interconnections between host processor 105 and system POR circuit 155 and interconnecting system POR circuit 155 to the Reset input of security processor 150 as shown. In addition, a dedicated reset signal line 160 is interconnected between a control pin of security processor 150 and the Reset lead 165 of host processor 105.

When power is initially supplied to electronic system 100, security processor 150 will internally execute instructions for initialization purposes and begin execution of recognition software (namely, authentication and/or verification software). After power-up and initialization, security processor 150 produces and continuously outputs an active HOST RESET signal over reset signal line 160 until the user has been recognized. Upon user recognition, reset signal line 160 is deactivated to allow host processor 105 to commence fetching boot instructions loaded in security processor 150. In this embodiment, the BIOS instructions are implemented within security processor 150 to ensure that requests for BIOS instructions by host processor 105 are denied until user recognition and to prevent circumvention of the circuitry through disconnection of reset signal line 160.

Figure 2:
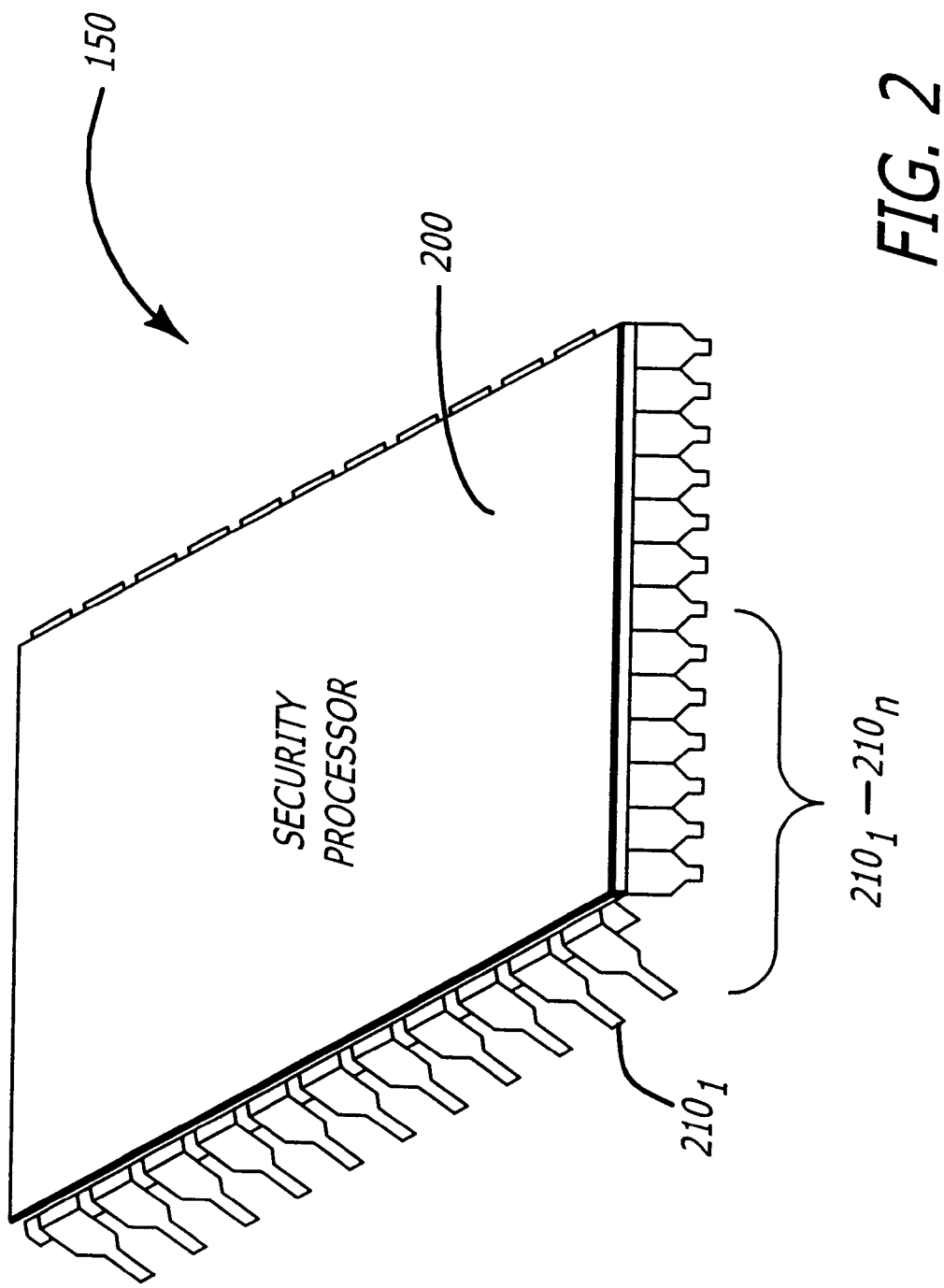
FIG. 2 is a perspective view of the security processor.

Referring to FIG. 2, a perspective view of security processor 150 is shown. The security processor 150 includes a package 200 which protects its internal circuitry from harmful environmental conditions. The package 200 includes a plurality of leads $210_1$–$210_n$ ("n" being a positive whole number) to receive and output address, data and control signals. These leads $210_1$–$210_n$ are in the form of pins (as shown), solder balls, or any other type of interconnect.

One of these leads (e.g., lead $210_1$) is configured as a Reset input. Upon lead $210_1$ receiving an active power-on reset (POR) signal from a system POR circuit 155, security processor 150 initializes its internal circuitry as well as one or more selected peripheral devices such as input device controller 140 of FIG. 1. This enables security processor 150 to receive character data from input device 145 of FIG. 1 for user recognition.

Figure 3:
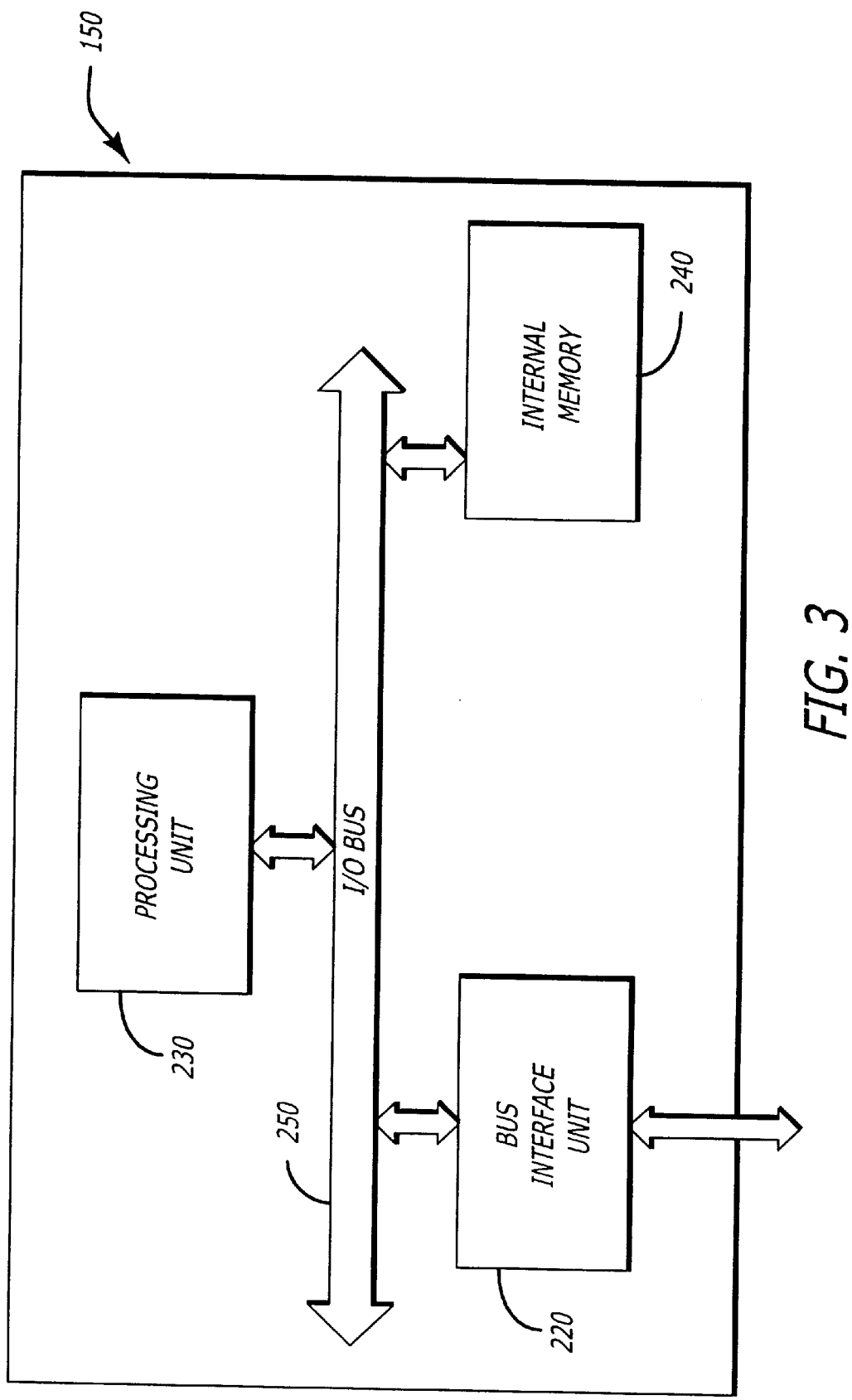
FIG. 3 is a block diagram of the internal circuitry of the security processor of FIGS. 1 and 2.

Referring now to FIG. 3, a more-detailed block diagram of a first illustrative embodiment of security processor 150 is shown. Security processor 150 includes a bus interface unit 220, a processing unit 230, and an internal memory unit 240. These units 220, 230 and 240 are coupled together through an internal bus 250. In this embodiment, bus interface unit 220 is capable of supporting communications with a bus (e.g., bus 130 of FIG. 1). For example, bus interface unit 220 is capable of receiving and routing information placed on bus 130 (of FIG. 1) and addressed for security processor 150. Likewise, bus interface unit 220 is capable of outputting information from processing unit 230 onto bus 130 of FIG. 1. Internal memory unit 240 includes non-volatile memory to contain boot software including BIOS instructions and perhaps authentication and/or identification software programs.

Figure 4:
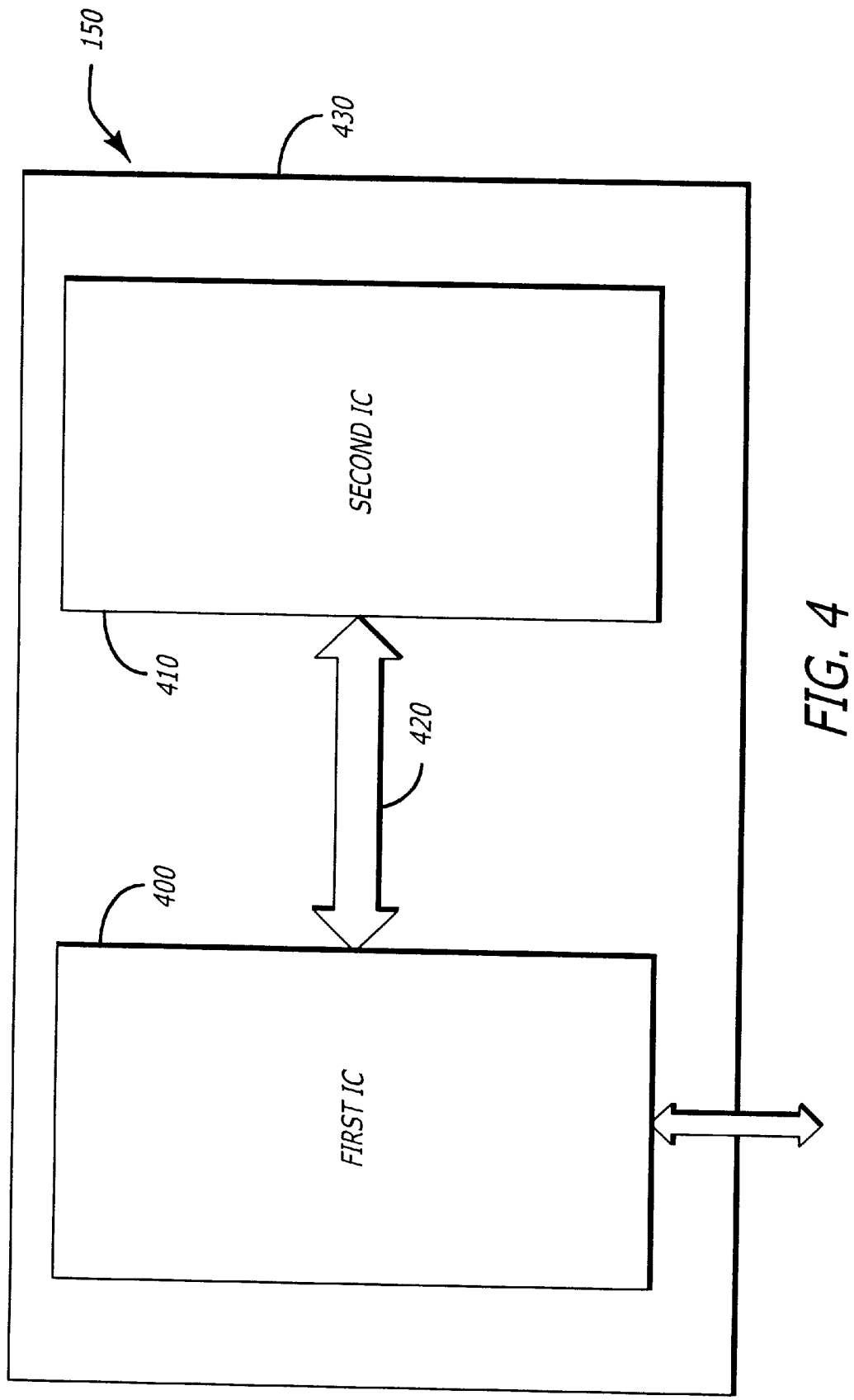
FIG. 4 is a block diagram of the internal circuitry of the security processor of FIGS. 1 and 2.

Referring now to FIG. 4, the security processor 150 may be constructed as a single integrated circuit (IC), multiple ICs placed in a single package or multiple ICs placed on a substrate such as a motherboard for example. In the event that multiple ICs are used, security processor 150 may be constructed with a first IC 400 featuring processing logic and a second IC 410 featuring a memory as shown in FIG. 4. The memory includes non-volatile memory although volatile memory may be used. These ICs 400 and 410 are interconnected by a bus 420 and packaged within a multichip package 430.

Figure 5:
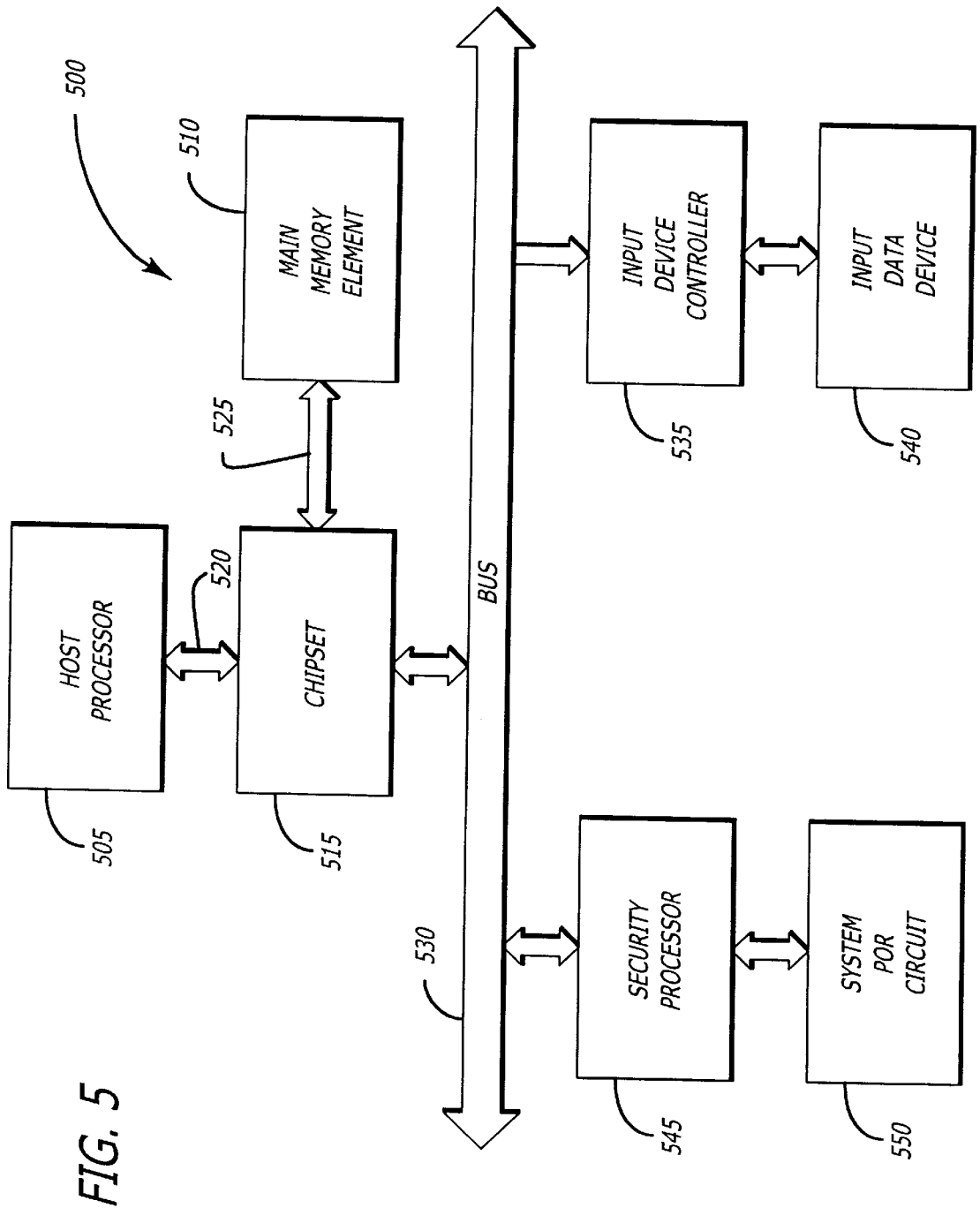
FIG. 5 is a second embodiment of the present invention.

Referring now to FIG. 5, a second illustrative embodiment for temporarily disabling normal operations of an electronic system 500 is shown. The electronic system 500 includes at least one host processor 505 and a main memory element 510 coupled together by a chipset 515 acting as an interface for a host bus 520, a memory bus 525 and a bus 530. Bus 530 provides a communication path for at least one input data device 540 (via an input device controller 535) and a security processor 545.

As shown, security processor 545 is coupled to bus 530 and to a system POR circuit 550. The system POR circuit 550 signals security processor 545 when a power-up condition occurs, normally by the user turning on electronic system 500. Although not shown, security processor 545 includes a processing unit and internal memory. The internal memory contains boot software and reset software. The boot software is capable of being executed by the processing unit of security processor 545 at power-up in order to initialize security processor 545 and to support communications between data input device 540 and security processor 545. The reset software is executed by the security processor 545 in response to a request by host processor 505 for the boot software. The reset software causes security processor 545 to transmit a sequence of instructions (e.g., "NO OP" instructions, jump instructions, etc.) to host processor 505 in order to keep it in an inoperative state until the user of the electronic system 500 is recognized.

In another embodiment (not shown), the boot software is located on a substrate (e.g., printed circuit board "PCB")

either on the same substrate or on another substrate. Regardless of its location in the electronic system, as long as the security processor has access to and exclusive control of the boot software prior to start-up and the host processor issuing requests for boot instructions to security processor, the security processor still would be able to preclude the host processor from obtaining access to boot instructions of the boot software. Access to the boot instructions would be released only upon successful authentication or identification of the user by the security processor.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An electronic system comprising:

a host processor;

a power-on reset circuit; and a deactivation circuit coupled to the host processor and the power-on reset circuit, the deactivation circuit to prevent the host processor from receiving instructions by continuously outputting an active reset signal to the host processor in response to a system power-on signal by the power-on reset circuit, the active reset signal places the host processor in an inoperative state until a user of the electronic system is recognized upon which the reset signal is deactivated.

2. The electronic system of claim 1, wherein the instructions include Basic Input/Output System (BIOS) instructions required during a boot procedure of the electronic system.

3. The electronic system of claim 1, wherein the deactivation circuit includes a security processor having a processing unit and an internal memory unit, the internal memory unit containing software used by the electronic system during a boot procedure.

4. The electronic system of claim 3, wherein the software contained within the internal memory unit includes Basic Input/Output System (BIOS) instructions.

5. The electronic system of claim 3, wherein the deactivation circuit further includes a signal line coupled to an output of the security processor and a Reset input of the host processor, the signal line, to transfer the reset signal.

6. The electronic system of claim 3, wherein the host processor fetches boot instructions from the security processor after the reset signal has been deactivated.

7. The electronic system of claim 1, wherein the deactivation circuit includes a security processor including a logic integrated circuit;

a memory integrated circuit; and a bus coupled to both the logic integrated circuit and the memory integrated circuit.

8. The electronic system of claim 7, wherein the memory integrated circuit contains at least one instruction needed for execution by the host processor during a boot procedure of the electronic system.

9. The electronic system of claim 7, wherein the security processor is placed in an operative state in response to the system power-on reset signal.

10. An electronic system comprising:

power means for transmitting a power-on reset signal at power-up of the electronic system;

processor means for executing a plurality of instructions; and deactivation means for preventing the processor means from obtaining a plurality of boot instructions in response to receipt of the system power-on reset signal from the power means and for continuously providing an active reset signal that places the processor means in an inoperative state immediately after power-up of the electronic system until a user of the electronic system is recognized, the deactivation means being coupled to the processor means and the power means.

11. An electronic system comprising:

a host processor; and a deactivation circuit coupled to the host processor, the deactivation circuit to (1) place the host processor in an inoperative state immediately after a system power-on reset signal is initiated in order to prevent the host processor from receiving any basic input output system (BIOS) instructions until a user of the electronic system is recognized by comparing the input data with data preloaded for use in identifying one or more authorized users, and (2) store BIOS instructions fetched by the host processor after the user is recognized.

12. The electronic system of claim 11, wherein the Basic Input/Output System (BIOS) instructions are required during a boot procedure of the electronic system.

13. A method for ensuring security of an electronic system, the method comprising:

placing a host processor in an inoperative state after power-on, which prevents the host processor from fetching any basic input output system (BIOS) instructions, by configuring a deactivation circuit to continuously output an active RESET signal to the host processor;

determining whether an intended user of the electronic system is recognized as an authorized user of the electronic system;

continuing to maintain the host processor in the inoperative state until the user is recognized as the authorized user; and placing the host processor in an operative state when the user is recognized as the authorized user.

14. The method of claim 13, wherein the determining on whether the intended user is the authorized user includes:

receiving input data associated with the intended user; and comparing the input data with character data of the authorized user provided prior to receiving the input data.

15. The method of claim 14, wherein the placing of the host processor in the operative state includes allowing access to a plurality of boot instructions by the host processor.

16. The method of claim 13, wherein the deactivation circuit includes a security processor and a power-on reset circuit, the power-on reset circuit signals the security processor to generate the active RESET signal in response to a power-up condition.

17. The method of claim 13, wherein the placing of the host processor in the operative state includes allowing the host processor to fetch BIOS instructions stored in the deactivation circuit.

* * * * *